United States Patent
Loreti et al.

(10) Patent No.: US 11,986,129 B1
(45) Date of Patent: May 21, 2024

(54) EGG CRACKER AND YOLK SEPARATOR

(71) Applicants: James A. Loreti, Suamico, WI (US);
Daniel Meyer, Howard, WI (US); Cole James Jorgensen, DePere, WI (US);
Marton Domokos, Boca Raton, FL (US)

(72) Inventors: James A. Loreti, Suamico, WI (US);
Daniel Meyer, Howard, WI (US); Cole James Jorgensen, DePere, WI (US);
Marton Domokos, Boca Raton, FL (US)

(73) Assignee: James A. Loreti, Suamico, WI (US)

( * ) Notice: Subject to any disclaimer, the term of this patent is extended or adjusted under 35 U.S.C. 154(b) by 0 days.

(21) Appl. No.: 18/438,845

(22) Filed: Feb. 12, 2024

Related U.S. Application Data

(60) Provisional application No. 63/446,042, filed on Feb. 16, 2023.

(51) Int. Cl.
*A47J 43/14* (2006.01)

(52) U.S. Cl.
CPC .................................... *A47J 43/14* (2013.01)

(58) Field of Classification Search
CPC ...................................................... A47J 43/14
See application file for complete search history.

(56) References Cited

U.S. PATENT DOCUMENTS

| | | | | |
|---|---|---|---|---|
| 460,875 | A * | 10/1891 | Kennedy | A47J 43/14 99/499 |
| 896,493 | A * | 8/1908 | Walz et al. | A47J 43/14 99/497 |
| 1,030,346 | A * | 6/1912 | Svensson et al. | A47J 43/14 99/500 |
| 1,727,493 | A * | 9/1929 | Tranin | A47J 43/14 99/538 |
| 1,892,539 | A * | 12/1932 | Regensburger | A47J 43/14 99/497 |
| D136,251 | S * | 8/1943 | Clark | D7/667 |
| 2,473,411 | A * | 6/1949 | Boden | A47J 43/14 99/500 |
| 2,523,546 | A * | 9/1950 | White | A47J 43/14 73/866 |
| 2,533,365 | A * | 12/1950 | Groeber | A47J 43/14 99/500 |
| 2,827,936 | A * | 3/1958 | Furphy | A47J 43/14 99/580 |

(Continued)

*Primary Examiner* — Sean M Michalski
(74) *Attorney, Agent, or Firm* — Donald J. Ersler

(57) ABSTRACT

An egg cracker and yolk separator preferably include an egg dish and a dish lid. The egg dish preferably includes a dish member, a handle member and a separator wall. The dish member preferably includes a dish base and a dish peripheral wall. The dish peripheral wall extends upward from the dish base. The dish peripheral wall includes a pouring portion wall, opposing side walls and a rear wall. The handle member extends from the rear wall. The separator wall is located in substantially a middle of the egg dish. An egg white opening is formed between a top of the dish base and a bottom of the separator wall. The dish lid preferably includes a lid base, a lid peripheral wall and a lift tab. The lid peripheral wall extends downward from a bottom of the lid base. A second embodiment includes a removable separator wall.

20 Claims, 10 Drawing Sheets

(56) References Cited

U.S. PATENT DOCUMENTS

| | | | | |
|---|---|---|---|---|
| 3,331,414 | A * | 7/1967 | Dillon | A47J 43/14 |
| | | | | D7/667 |
| 4,665,813 | A * | 5/1987 | Maisonneuve | A47J 43/14 |
| | | | | D7/693 |
| 5,088,392 | A * | 2/1992 | Ancona | A47J 43/25 |
| | | | | 99/506 |
| D413,492 | S | 9/1999 | Wang | |
| 6,135,017 | A * | 10/2000 | Wang | A23J 1/09 |
| | | | | 99/497 |
| 6,234,070 | B1 * | 5/2001 | Hutchison | A47J 43/145 |
| | | | | 99/581 |
| 6,303,915 | B1 * | 10/2001 | Young | A23L 15/00 |
| | | | | 220/573.1 |
| D499,312 | S * | 12/2004 | So | D7/667 |
| 6,915,735 | B1 * | 7/2005 | So | A47J 43/14 |
| | | | | 99/497 |
| D555,984 | S * | 11/2007 | Curtin | D7/667 |
| 7,934,755 | B2 * | 5/2011 | Missakian | A47J 43/283 |
| | | | | 294/7 |
| 8,733,238 | B2 * | 5/2014 | Myoung | A47J 43/14 |
| | | | | 99/497 |
| 10,368,697 | B2 | 8/2019 | Sorensen et al. | |
| 10,722,076 | B1 * | 7/2020 | Mao | A47J 43/14 |
| D905,507 | S * | 12/2020 | Hazelton | D7/665 |
| D922,815 | S * | 6/2021 | He | D7/369 |
| 2012/0125210 | A1 * | 5/2012 | Myoung | A47J 43/14 |
| | | | | 99/497 |
| 2015/0257604 | A1 * | 9/2015 | Heyden | B26B 29/02 |
| | | | | 30/120.1 |
| 2017/0007076 | A1 * | 1/2017 | Sorensen | A47J 43/14 |
| 2017/0265506 | A1 * | 9/2017 | Robertson | A47J 43/14 |
| 2018/0110244 | A1 * | 4/2018 | de Martrin-Donos | A47J 29/02 |
| 2020/0245817 | A1 * | 8/2020 | Ribeiro | B26F 3/002 |
| 2020/0297166 | A1 * | 9/2020 | Mao | A47J 43/14 |
| 2022/0346588 | A1 * | 11/2022 | Hampson | A47G 21/04 |

\* cited by examiner

EGG CRACKER AND YOLK SEPARATOR

CROSS REFERENCE TO RELATED APPLICATIONS

This application claims the benefit of U.S. provisional patent application No. 63/446,042 filed Feb. 16, 2023, which is thereby Incorporated by reference in its entirety.

BACKGROUND OF THE INVENTION

1. Field of the Invention

The present invention relates generally to cooking and more specifically to an egg cracker and yolk separator, which may be used to crack an egg, separate the yolk from the egg white, and store the yolk or the egg white or both.

2. Discussion of the Prior Art

Patent no. D413492 to Wang discloses an egg separator. Patent no. 10368697 to Sorensen et al. discloses an egg cracker, egg separator and/or egg mixer.

Accordingly, there is a clearly felt need in the art for an egg cracker and yolk separator, which may be used to crack an egg, separate the yolk from the egg white, and store the yolk or the egg white or both.

SUMMARY OF THE INVENTION

The present invention provides an egg cracker and yolk separator, which may be used to crack an egg, separate the yolk from the egg white, or store the yolk or the egg white. The egg cracker and yolk separator preferably include an egg dish and a dish lid. The egg dish preferably includes a dish member, a handle member and a separator wall. The dish member preferably includes a dish base and a dish peripheral wall. The dish peripheral wall extends upward from the dish base. A shape of an outer perimeter of the dish base includes a substantially egg shape. The dish peripheral wall includes a pouring portion wall, opposing side walls and a rear wall. The pouring portion extends upward from the dish base at a substantially obtuse angle and comes to a substantial point. A maximum obtuse angle occurs at a front of the dish member. The substantial point forms a pouring lip for the dish member to facilitate pouring out the egg white of an egg. A front of the opposing side members extend from a rear of the pouring portion wall. The rear wall terminates a rear of the opposing side members. The handle member extends outward from an outer surface of the rear wall, preferably at a top thereof.

The separator wall is located in substantially a middle of the egg dish. The separator wall extends from an inner surface of a first opposing wall to an inner surface of a second opposing wall. The separator wall forms an egg area and a pouring area. An egg white opening is formed between a top of the dish base and a bottom of the separator wall to allow the egg white to flow from the egg area to the pouring area. The pouring lip allows the egg white to be separated from the yolk and poured into another container. A pair of yolk retainers preferably extend between the separator wall and the opposing side walls. The pair of yolk retainers prevent a yolk from falling out of the egg area, when the egg white is being poured from the pouring area.

The dish lid preferably includes a lid base, a lid peripheral wall and a lift tab. The lid base includes an outer perimeter which has the same shape as an outer perimeter of a top of the dish peripheral wall. The lid peripheral wall extends downward from a bottom of the lid base at a small inward acute angle. An inside bottom peripheral edge of the lid peripheral wall is slightly less than a top outer perimeter of the dish peripheral wall to ensure that the dish lid stays retained on the dish peripheral wall. The dish lid is fabricated from a resilient material with memory, which allows the lid peripheral wall to stretch to receive the top of the dish peripheral wall. The lift tab preferably extends from a rear of the lid base.

A user will utilize a top of the separator wall to crack an egg. The user manipulates the contents of the egg, such that the yolk and egg white go into the egg area. The user may crack several eggs and direct their contents into the egg area. The contents of multiple eggs could be stored in the egg dish by snapping the dish lid onto the egg dish. The egg white may be poured into a first container for use or storage. The yolk may be poured into a second container for use or storage.

A second embodiment of the egg cracker and yolk separator preferably includes an egg dish and a dish lid. The egg dish preferably includes a dish member, a removable separator wall and a handling pad. The dish member preferably includes a dish base, a dish peripheral wall and a handle member. The dish peripheral wall extends upward from the dish base. A shape of an outer perimeter of the dish base includes a substantially egg shape. The dish peripheral wall includes a pouring portion wall, opposing side walls and a rear wall. The pouring portion extends upward from the dish base at a substantially obtuse angle and comes to a substantial point. A maximum obtuse angle preferably occurs at a front of the dish member. The substantial point forms a pouring lip for the dish member to facilitate pouring out the egg white of an egg. A front of the opposing side members extend from a rear of the pouring portion wall. The rear wall terminates a rear of the opposing side members. The handle member extends outward from an outer surface of the rear wall, preferably at a top thereof. A pair separator wall projections are formed on opposing sides of the peripheral wall. A wall slot formed between the pair of separator wall projections are sized to receive the removable separator wall. The handling pad is bonded to a top of the handle member with any suitable bonding substance. The handling pad is made from a soft-to-the-touch material for reducing user fatigue.

The removable separator wall is located in substantially a middle of the egg dish. The removable separator wall preferably includes a separator wall member and a pair of yolk wings. The pair of yolk wings extend behind the separator wall member on opposing ends thereof and to the opposing side walls of the egg dish. The pair of yolk wings prevent an egg yolk from flowing over a top of the separator wall member, when the egg white is being poured from the pouring area. The removable separator wall forms an egg area and a pouring area. An egg white opening is formed between a top of the dish base and a bottom of the separator wall member to allow the egg white to flow from the egg area to the pouring area. The pouring lip allows the egg white to be poured into another container.

The dish lid preferably includes a lid base, a lid peripheral wall, a front retention lip and a rear retention lip. The lid base includes an outer perimeter which has the same shape as an outer perimeter of a top of the dish peripheral wall. The lid peripheral wall extends downward from a bottom of the lid base at a small inward acute angle. An inside bottom peripheral edge of the lid peripheral wall is slightly less than a top outer perimeter of the dish peripheral wall to ensure that the dish lid stays retained on the dish peripheral wall. The front retention lip is formed on a front of the dish lid and hooks over the pouring portion wall. The rear retention lip is formed on a rear of the dish lid and hooks over the handle member. The dish lid is fabricated from a resilient material with memory, which allows the lid peripheral wall to stretch to receive the top of the dish peripheral wall.

The user will utilize a top of the separator wall to crack an egg. The user manipulates the contents of the egg, such that the yolk and egg white go into the egg area. The user may crack several eggs and direct their contents into the egg area. The contents of multiple eggs could be stored in the egg dish by snapping the dish lid onto the egg dish. The egg white may be poured into a first container for use or storage. The yolk may also be poured into a second container for use or storage.

Accordingly, it is an object of the present invention to provide an egg cracker and yolk separator, which may be used to crack an egg, separate the yolk from the egg white, and store the yolk or the egg white or both.

These and additional objects, advantages, features and benefits of the present invention will become apparent from the following specification.

DETAILED DESCRIPTION OF THE PREFERRED EMBODIMENTS

Figure 1:
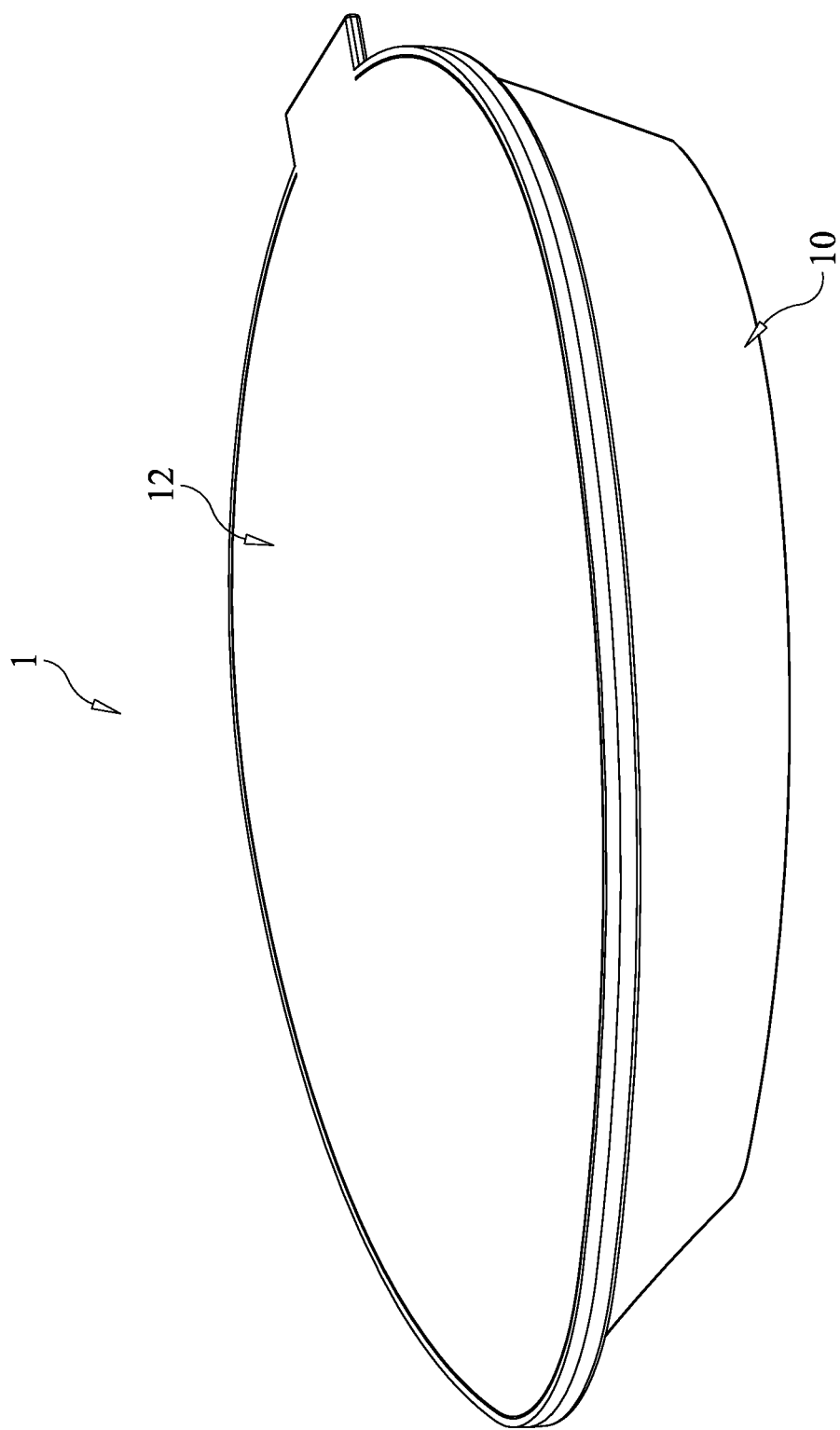
FIG. 1 is a perspective view of an egg cracker and yolk separator in accordance with the present invention.
Figure 2:
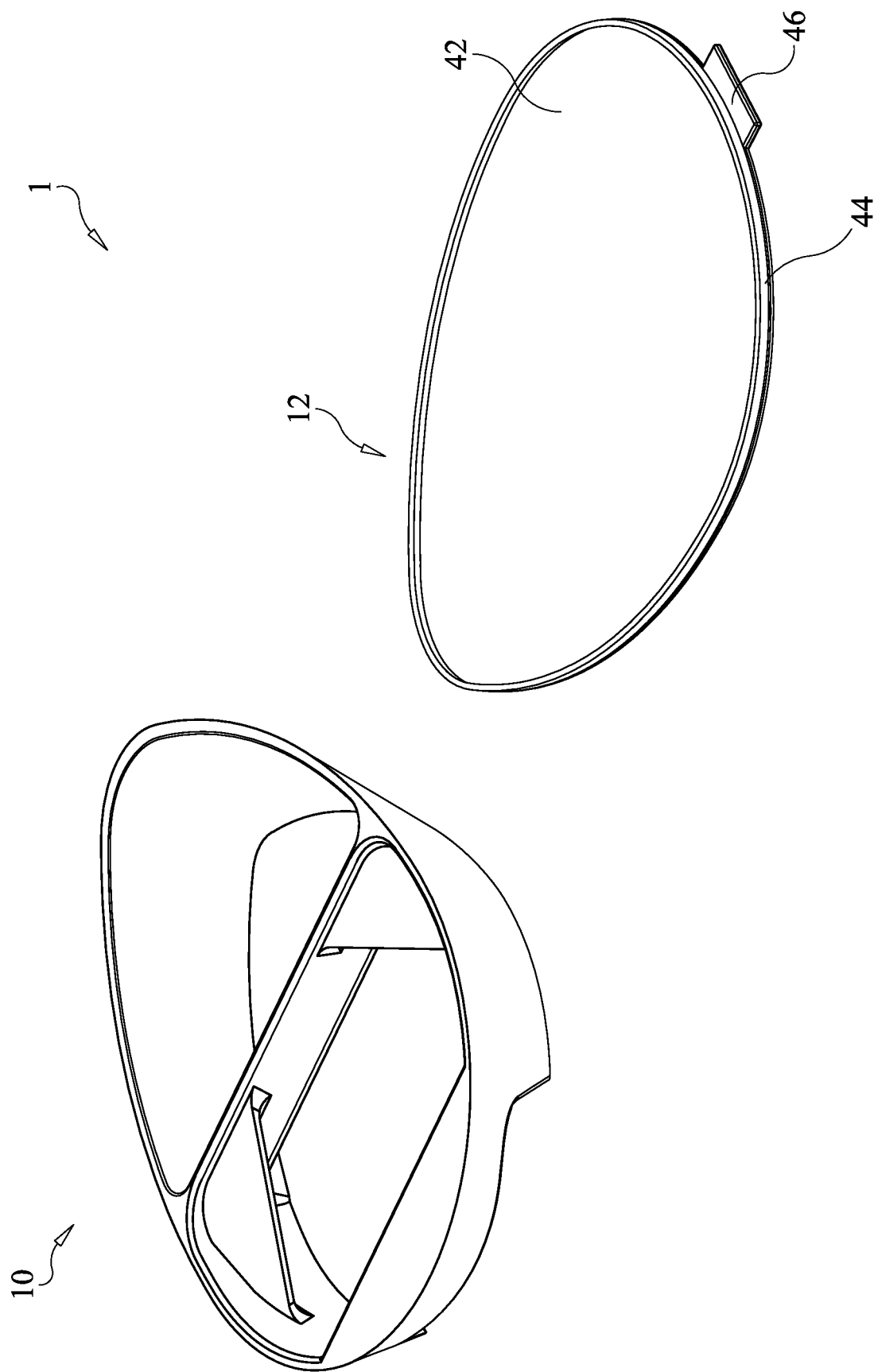
FIG. 2 is an exploded perspective view of an egg cracker and yolk separator in accordance with the present invention.
Figure 3:
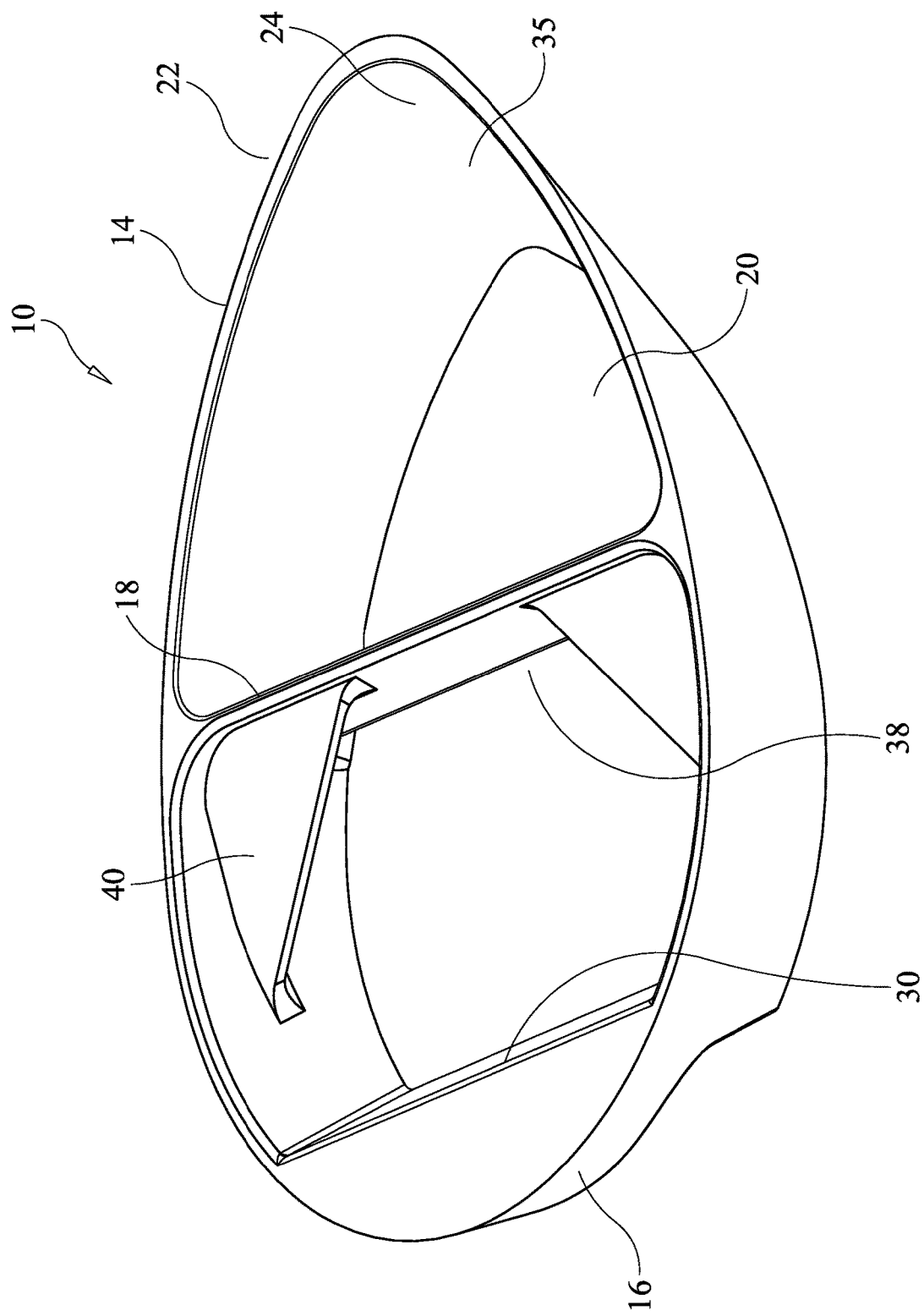
FIG. 3 is a top perspective view of an egg dish of an egg cracker and yolk separator in accordance with the present invention.
Figure 4:
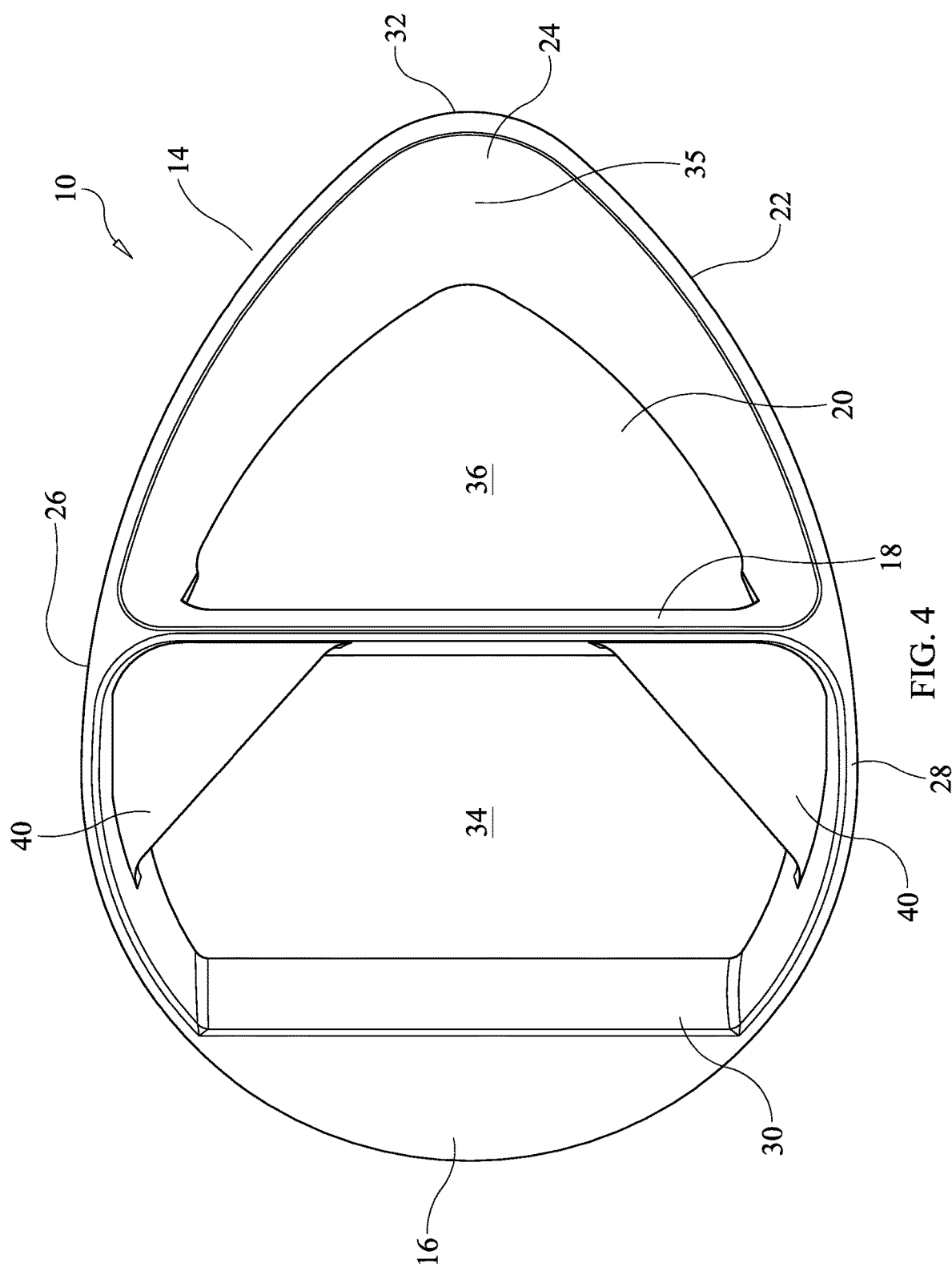
FIG. 4 is a top view of an egg dish of an egg cracker and yolk separator in accordance with the present invention.
Figure 5:
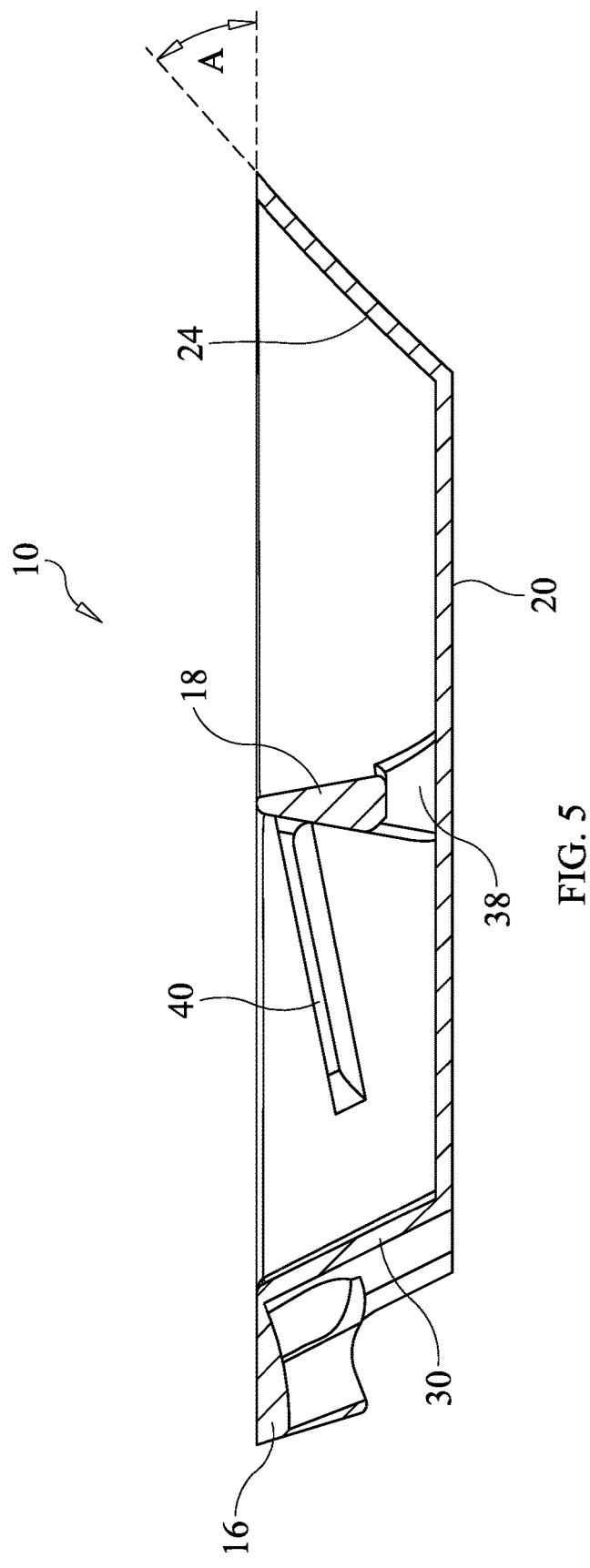
FIG. 5 is a cross sectional view of an egg dish of an egg cracker and yolk separator in accordance with the present invention.

With reference now to the drawings, and particularly to FIG. 1, there is shown a perspective view of an egg cracker and yolk separator 1. With reference to FIG. 2, the egg cracker and yolk separator 1 preferably include an egg dish 10 and a dish lid 12. With reference to FIGS. 3-5, the egg dish 10 preferably includes a dish member 14, a handle member 16 and a separator wall 18. The dish member 14 preferably includes a dish base 20 and a dish peripheral wall 22. The dish peripheral wall 22 extends upward from the dish base 20. A shape of an outer perimeter of the dish base 20 includes a substantial egg shape. The dish peripheral wall 22 includes a pouring portion wall 24, opposing side walls 26, 28 and a substantially flat rear wall 30. The pouring portion 24 extends upward from the dish base at a substantially obtuse angle A and comes to a substantial point 32. A maximum obtuse angle A occurs at a front of the dish member 10. The substantial point 32 forms a pouring lip 35 for the dish member 10 to facilitate pouring out the egg white of an egg. A front of the opposing side members 26, 28 extend backward from a rear of the pouring portion wall 24. The substantially flat rear wall 30 terminates a rear of the opposing side members 26, 28. The handle member 16 extends outward from an outer surface of the rear wall 30, preferably at a top thereof.

The separator wall 18 is located in substantially a middle of the egg dish 10. The separator wall 18 extends from an inner surface of a first opposing wall 26 to an inner surface of a second other opposing wall 28. The separator wall 18 forms an egg area 34 and a pouring area 36. The separator wall 18 may be molded as an integral portion of the egg dish 10, or a separate piece, which is attached to the egg dish 10 with any suitable method. An egg white opening 38 is formed between a top of the dish base 20 and a bottom of the separator wall 18 to allow the egg white to flow from the egg area 34 to the pouring area 36. The egg white opening 38 includes a height that allows the flow of the egg white therethrough, but does not allow the flow of an egg yolk therethrough. The pouring lip 35 allows the egg white to be poured into another container. A pair of yolk retainers 40 preferably extend between the separator wall 18 and the opposing side walls 26, 28. The pair of yolk retainers 40 prevent a yolk from falling out of the egg area 34, when the egg white is being poured from the pouring area 36. The pair of yolk retainers 40 may be molded as an integral portion of the egg dish 10, or separate pieces, which are attached to the egg dish 10 with any suitable method.

Figure 6:
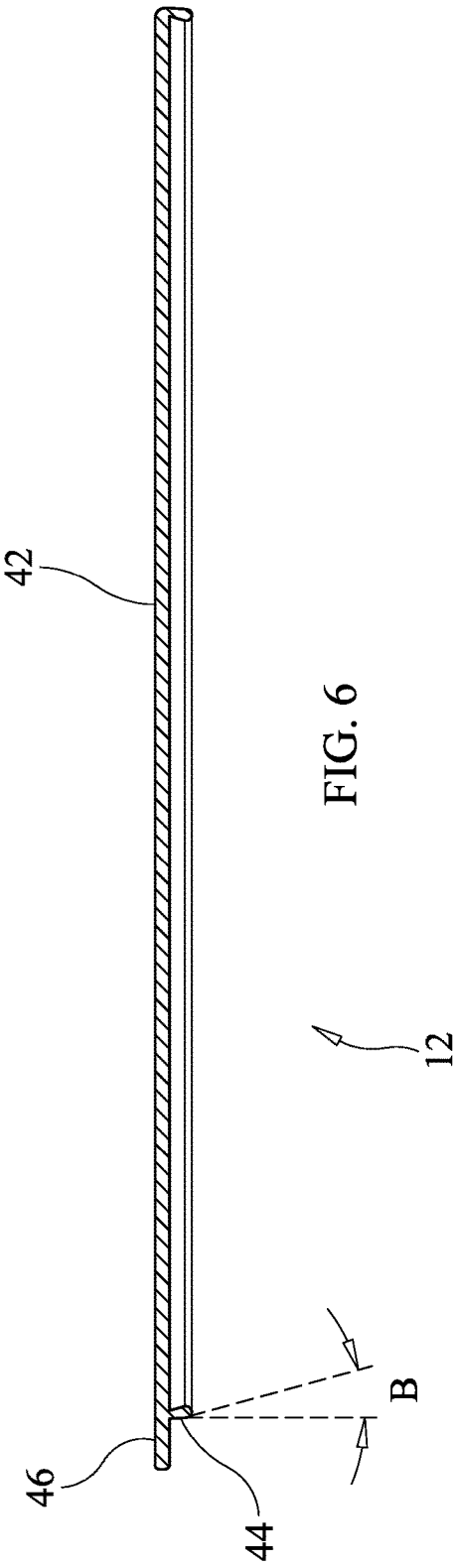
FIG. 6 is a cross sectional view of a dish lid of an egg cracker and yolk separator in accordance with the present invention.

With reference to FIG. 6, the dish lid 12 preferably includes a lid base 42, a lid peripheral wall 44 and a lift tab 46. The lid base 42 includes an outer perimeter which has the same shape as an outer perimeter of a top of the dish peripheral wall 22. The lid peripheral wall 44 extends downward from a bottom of the lid base 42 at a small inward acute angle B. A bottom peripheral edge of the lid peripheral wall 44 is slightly less in length than a top outer perimeter of the dish peripheral wall 22 to ensure that the dish lid 12 stays retained on the dish peripheral wall. The dish lid 12 is fabricated from a resilient material with memory, which allows the lid peripheral wall 44 to stretch to receive the top of the dish peripheral wall 22. The lift tab 46 preferably extends from a rear of the lid base 42.

A user will utilize a top of the separator wall 18 to crack an egg. The user manipulates the contents of the egg, such that the yolk and egg white go into the egg area 34. The user may crack several eggs and direct their contents into the egg area 34. The contents of multiple eggs could be stored in the egg dish 10 by snapping the dish lid 12 onto the egg dish 10. The egg white may be poured into a first container for use or storage. The yolk may be poured into a second container for use or storage.

Figure 7:
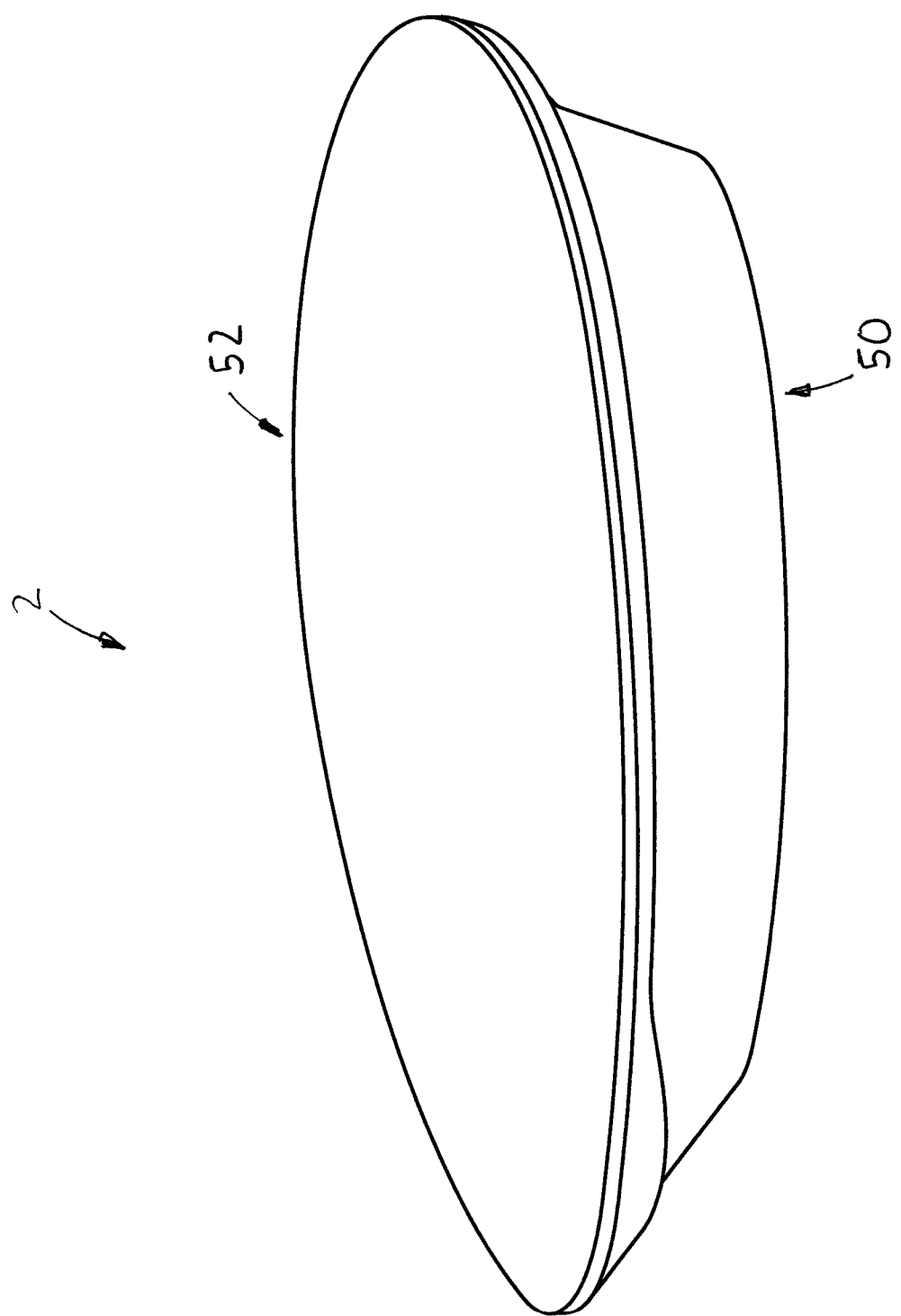
FIG. 7 is a perspective view of a second embodiment of an egg cracker and yolk separator in accordance with the present invention.
Figure 8:
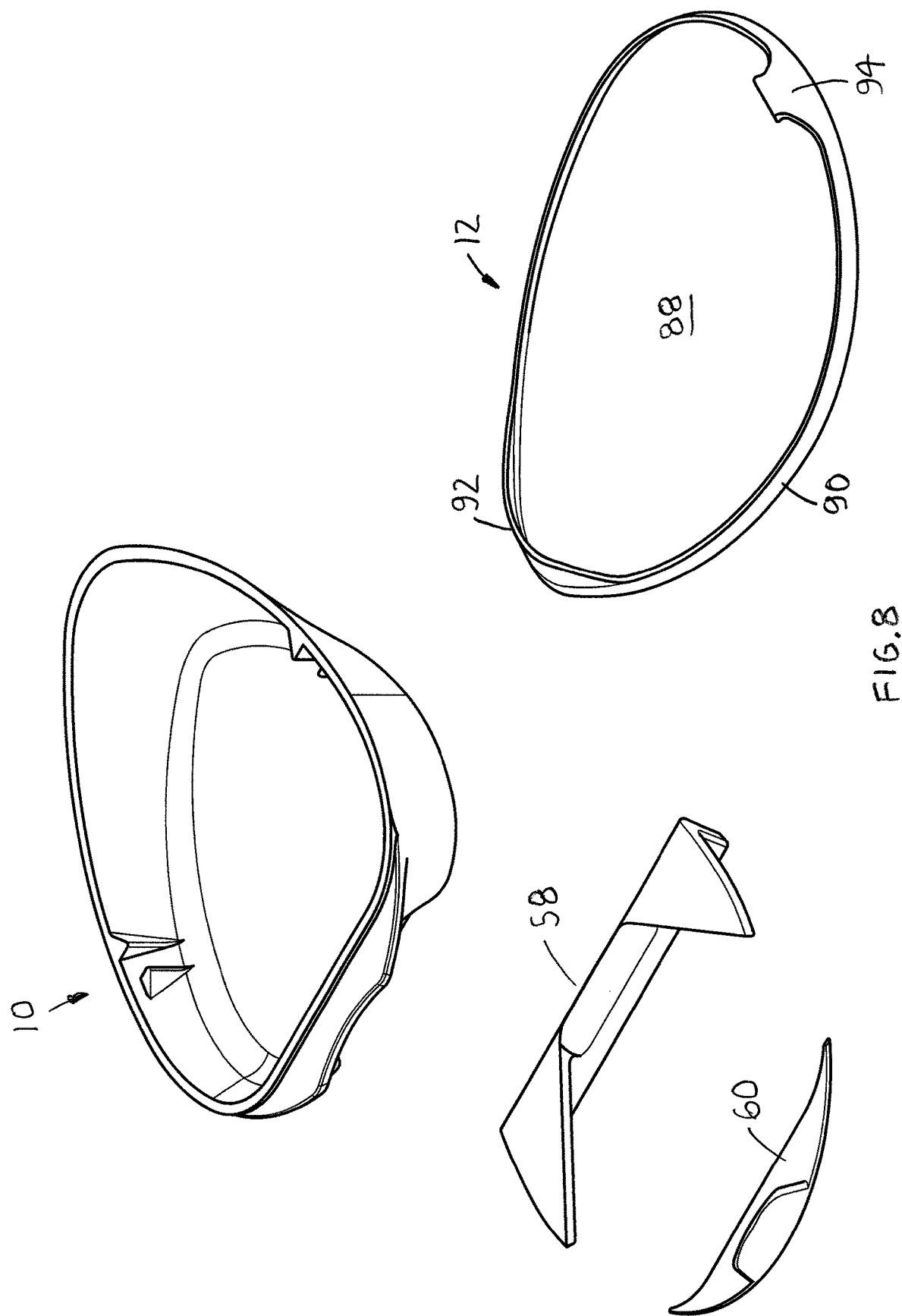
FIG. 8 is an exploded perspective view of a second embodiment of an egg cracker and yolk separator with bottom views of a dish lid and a handling pad in accordance with the present invention.
Figure 9:
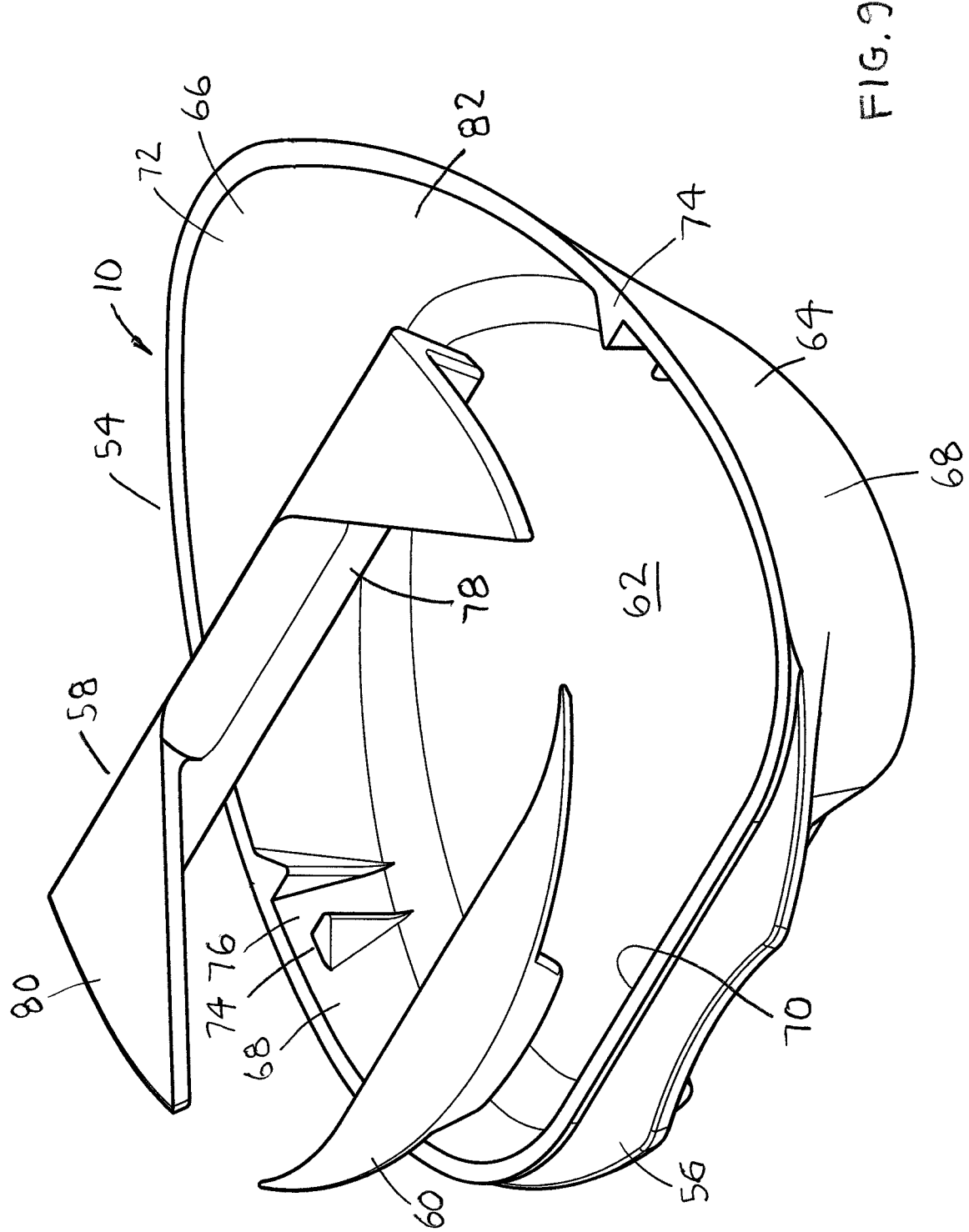
FIG. 9 is an exploded perspective view of an egg dish of a second embodiment of an egg cracker and yolk separator in accordance with the present invention.
Figure 10:
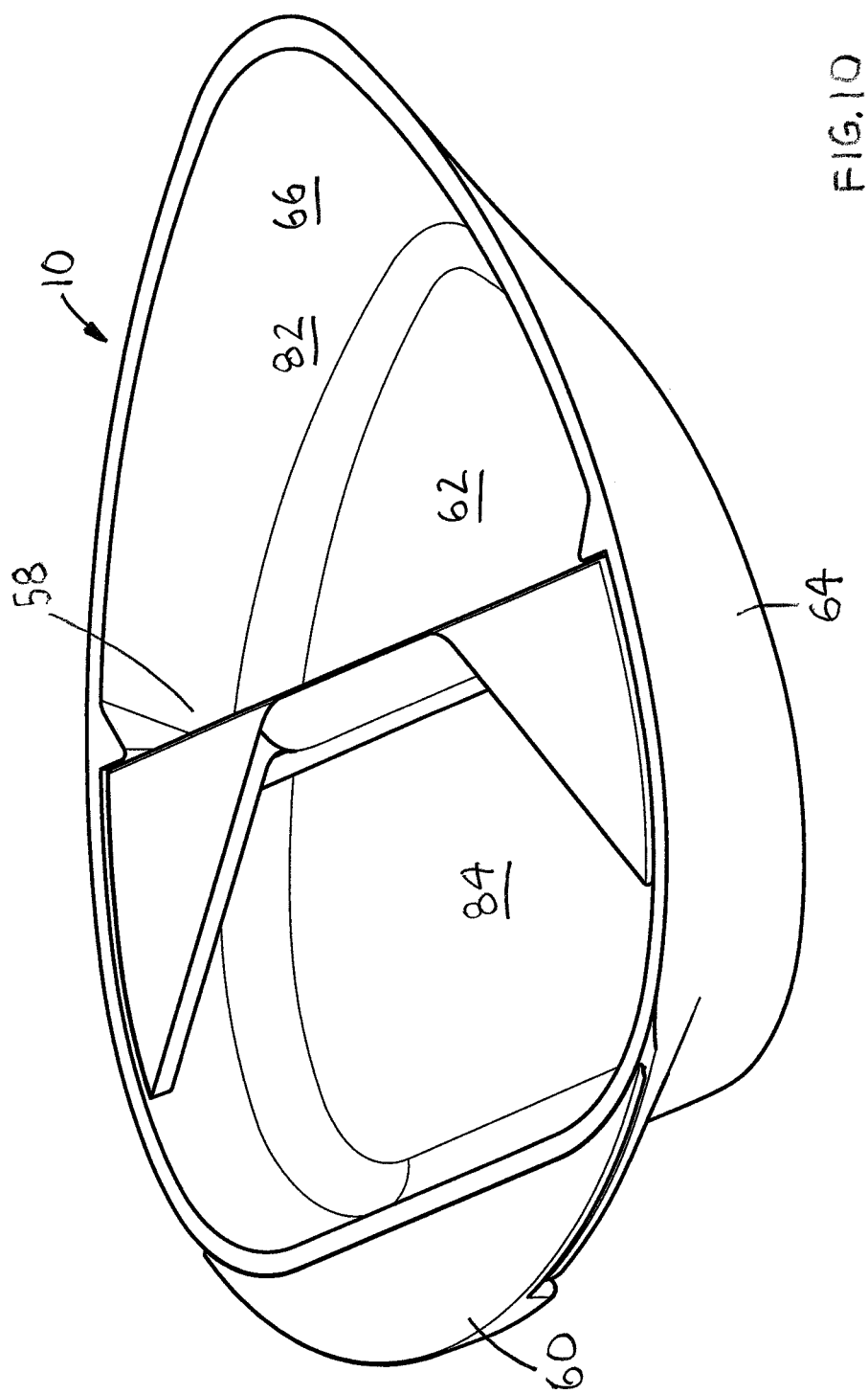
FIG. 10 is a perspective view of an egg dish of a second embodiment of an egg cracker and yolk separator in accordance with the present invention.

With reference to FIG. 7, a second embodiment of the egg cracker and yolk separator 2 preferably include an egg dish 50 and a dish lid 52. With reference to FIGS. 8-10, the egg dish 52 preferably includes a dish member 54, a removable separator wall 58 and a handling pad 60. The dish member 54 preferably includes a dish base 62, a dish peripheral wall 64 and a handle member 56. The dish peripheral wall 64 extends upward from the dish base 62. A shape of an outer perimeter of the dish base 62 includes a substantially egg shape. The dish peripheral wall 64 includes a pouring portion wall 66, opposing side walls 68 and a rear wall 70. The pouring portion wall 66 extends upward from the dish base 62 at a substantially obtuse angle and comes to a substantial point. A maximum obtuse angle occurs at a front of the dish member 54. The substantial point forms a pouring lip 72 for the dish member 54 to facilitate pouring out the egg white of an egg. A front of the opposing side members 68 extend from a rear of the pouring portion wall 66. The rear wall 70 terminates a rear of the opposing side members 68. The handle member 56 extends outward from an outer surface of the rear wall 70, preferably at a top thereof. A pair separator wall projections 74 are formed on opposing sides of the peripheral wall 64. A wall slot 76 formed between the pair of separator wall projections 74 is sized to receive the removable separator wall 58. The handling pad 60 is bonded to a top of the handle member 56 with any suitable bonding substance. The handling pad 56 is fabricated from a soft-to-the-touch material for user reducing fatigue.

Figure 11:
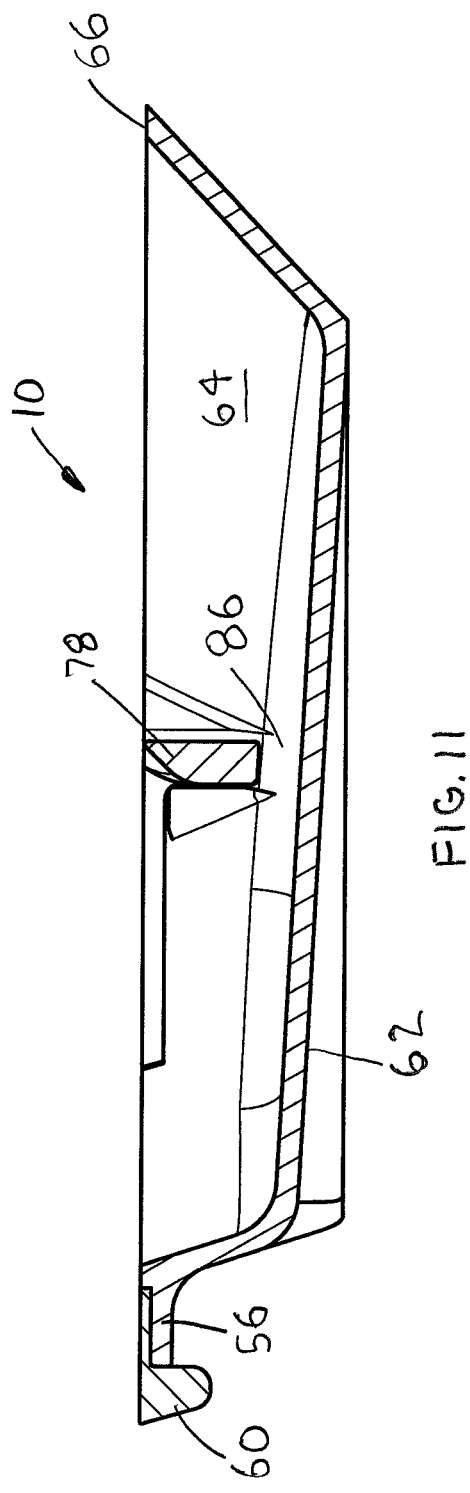
FIG. 11 is a cross sectional view of an egg dish of a second embodiment of an egg cracker and yolk separator in accordance with the present invention.

The removable separator wall 58 is located in substantially a middle of the egg dish 10. The removable separator wall 58 preferably includes a separator wall member 78 and a pair of yolk wings 80. The pair of yolk wings 80 extend behind the separator wall member 78 on opposing ends thereof and to the opposing side walls 64 of the egg dish 10. The pair of yolk wings 80 prevent an egg yolk from flowing over a top of the separator wall member 78, when the egg white is being poured from the pouring area 82. The removable separator wall 58 forms an egg area 84 and the pouring area 82. With reference to FIG. 11, an egg white opening 86 is formed between a top of the dish base 62 and a bottom of the separator wall member 78 to allow the egg white to flow from the egg area 84 to the pouring area 82. The pouring lip 72 allows the egg white to be separated from the yolk and poured into another container. The dish base 62 preferably includes an inclined surface, where the lowest end is at a front of the egg dish 10.

Figure 12:
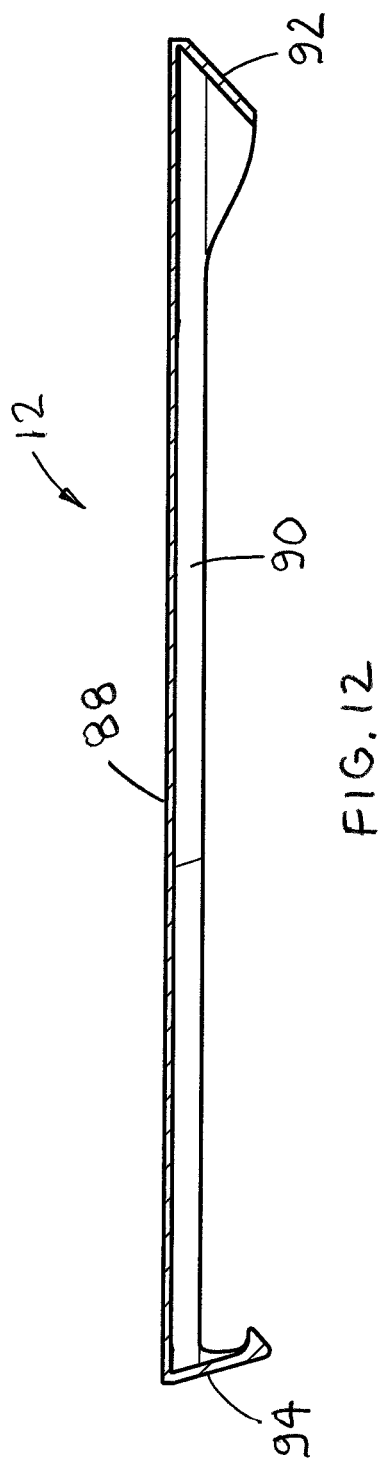
FIG. 12 is a cross sectional view of a dish lid of a second embodiment of an egg cracker and yolk separator in accordance with the present invention.

With reference to FIG. 12 The dish lid 12 preferably includes a lid base 88, a lid peripheral wall 90, a front retention lip 92 and a rear retention lip 94. The lid base 88 includes an outer perimeter, which has the same shape as an outer perimeter of a top of the dish peripheral wall 64. The lid peripheral wall 90 extends downward from a bottom of the lid base 88 at a small inward acute angle. An inside bottom peripheral edge of the lid peripheral wall 90 is slightly less than a top outer perimeter of the dish peripheral wall 64 to ensure that the dish lid 12 stays retained on the dish peripheral wall 64. The front retention lip 92 is formed on a front of the dish lid 12 and hooks over the pouring portion wall 66. The rear retention lip 94 is formed on a rear of the dish lid 12 and hooks over the handle member 56. The dish lid 12 is fabricated from a resilient material with memory, which allows the lid peripheral wall 90 to stretch to receive the top of the dish peripheral wall 64.

The user will utilize a top of the separator wall member 78 to crack an egg. The user manipulates the contents of the egg, such that the yolk and egg white go into the egg area 84. The user may crack several eggs and direct their contents into the egg area 84. The contents of multiple eggs could be stored in the egg dish 10 by snapping the dish lid 12 onto the egg dish 10. The egg white may be poured into a first container for use or storage. The yolk may also be poured into a second container for use or storage.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A egg cracker and yolk separator, comprising:
a dish member includes a dish base and a dish peripheral wall, said dish peripheral wall extends upward from said dish base, said dish peripheral wall includes a pour portion formed at a front, opposing side walls and a rear wall; and
a separator wall is located in substantially a middle of said egg dish, said separator wall extends between said opposing side walls, an egg white opening is formed between a top of said dish base and a bottom of said separator wall, wherein said egg white opening includes a height that allows a flow of egg white therethrough, but does not allow a flow of an egg yolk therethrough.

2. The egg cracker and yolk separator of claim 1, wherein:
a handle member extends outward from an outer surface of said rear wall.

3. The egg cracker and yolk separator of claim 1, wherein:
a top of an outer perimeter of said dish peripheral wall has a substantial egg shape.

4. The egg cracker and yolk separator of claim 1, wherein:
an egg area is formed between said egg separator and said rear wall, a pour area is formed between said egg separator and said pour portion.

5. The egg cracker and yolk separator of claim 1, wherein:
a pair of yolk retainers extend between said separator wall and said opposing side walls.

6. The egg cracker and yolk separator of claim 1, wherein:
a dish lid includes a lid base and a lid peripheral wall, said lid peripheral wall extends downward from a bottom of said lid base, said lid peripheral wall is sized to receive an outer perimeter of said dish peripheral wall.

7. A egg cracker and yolk separator, comprising:
a dish member includes a dish base and a dish peripheral wall, said dish peripheral wall extends upward from said dish base, said dish peripheral includes a pour portion formed at a front, opposing side walls and a rear wall, said pouring portion extend upward from said dish base at a substantially obtuse angle to form a pouring lip; and
a separator wall is located in substantially a middle of said egg dish, said separator wall extends between said opposing side walls, an egg white opening is formed between a top of said dish base and a bottom of said separator wall, wherein said egg white opening includes a height that allows a flow of egg white therethrough, but does not allow a flow of an egg yolk therethrough.

8. The egg cracker and yolk separator of claim 7, wherein:
a handle member extends outward from an outer surface of rear wall.

9. The egg cracker and yolk separator of claim 7, wherein:
a top of an outer perimeter of said dish peripheral wall has a substantial egg shape.

10. The egg cracker and yolk separator of claim 7, wherein:
an egg area is formed between said egg separator and said rear wall, a pour area is formed between said egg separator and said pour portion.

11. The egg cracker and yolk separator of claim 7, wherein:
a pair of yolk retainers extend between said separator wall and said opposing side walls.

12. The egg cracker and yolk separator of claim 7, wherein:
a dish lid includes a lid base and a lid peripheral wall, said lid peripheral wall extends downward from a bottom of said lid base, said lid peripheral wall is sized to receive an outer perimeter of said dish peripheral wall.

13. A egg cracker and yolk separator, comprising:
a dish member includes a dish base and a dish peripheral wall, said dish peripheral wall extends upward from said dish base, said dish peripheral wall includes a pour portion formed at a front, opposing side walls and a rear wall; and
a removable separator wall is located in substantially a middle of said egg dish, said removable separator wall extends between said opposing side walls, an egg white opening is formed between a top of said dish base and a bottom of separator wall, wherein said egg white opening includes a height that allows a flow of egg white therethrough, but does not allow a flow of an egg yolk therethrough.

14. The egg cracker and yolk separator of claim 13, wherein:
a handle member extends outward from an outer surface of said rear wall.

15. The egg cracker and yolk separator of claim 13, wherein:
a top of an outer perimeter of said dish peripheral wall has a substantial egg shape.

16. The egg cracker and yolk separator of claim 13, wherein:
an egg area is formed between said egg separator and said rear wall, a pour area is formed between said egg separator and said pour portion.

17. The egg cracker and yolk separator of claim 13, wherein:
said removable separator wall includes a wall member and a pair of yolk wings, said pair of yolk wings extend behind said separator wall member on opposing ends thereof and to said opposing side walls of said egg dish.

18. The egg cracker and yolk separator of claim 17, wherein:
a pair of separator wall projections are formed on said opposing side wall, a wall slot formed between said pair of separator wall projections is sized to receive said removable separator wall.

19. The egg cracker and yolk separator of claim 13, wherein:
a dish lid includes a lid base and a lid peripheral wall, said lid peripheral wall extends downward from a bottom of said lid base, said lid peripheral wall is sized to receive an outer perimeter of said dish peripheral wall.

20. The egg cracker and yolk separator of claim 18, wherein:
said dish lid is fabricated from a resilient material with memory, which allows said lid peripheral wall to stretch to receive a top of said dish peripheral wall.

* * * * *